United States Patent [19]

Itoh

[11] 4,078,840
[45] Mar. 14, 1978

[54] VEHICLE BODY CONSTRUCTION

[75] Inventor: Hiroshi Itoh, Tokyo, Japan

[73] Assignee: Nissan Motor Company, Limited, Yokohama, Japan

[21] Appl. No.: 698,456

[22] Filed: Jun. 21, 1976

[30] Foreign Application Priority Data

Jun. 24, 1975 Japan .................................. 50-77642

[51] Int. Cl.$^2$ ............................................. B62D 27/00
[52] U.S. Cl. .................................. 296/28 G; 98/2.07; 98/2.16
[58] Field of Search ................. 296/28 G, 28 H, 28 R; 98/2.07, 2.16, 2.17

[56] References Cited

U.S. PATENT DOCUMENTS

| 2,551,528 | 5/1951 | Darrin | 296/28 R |
|---|---|---|---|
| 2,687,326 | 8/1954 | Vahey | 296/28 R |
| 2,975,696 | 3/1961 | Jewell | 296/28 G |
| 3,120,797 | 2/1964 | Beyer | 98/2.16 |
| 3,208,368 | 9/1965 | Peras | 98/2.07 |
| 3,289,564 | 12/1966 | DeCoye De Castelet | 98/2.07 |
| 3,329,078 | 7/1967 | DeCoye De Castelet | 98/2.07 |
| 3,718,364 | 2/1973 | Fischer | 296/28 R |
| 3,827,525 | 8/1974 | Felzer | 296/28 R |
| 3,831,997 | 8/1974 | Myers | 296/28 R |
| 3,909,058 | 9/1975 | Kramer | 296/28 R |

Primary Examiner—Joseph F. Peters, Jr.
Assistant Examiner—John A. Carroll
Attorney, Agent, or Firm—Frank J. Jordan

[57] ABSTRACT

A vehicle body construction having a passenger compartment, comprising a substantially closed box section cowl top mounted in front of the passenger compartment and extending in a lateral direction of the body, closed box section front pillars extending upwardly at each side of the passenger compartment, and closed box sections each formed by a hoodridge panel constituting an engine room side wall and a suspension member supporting a suspension system and constituting reinforcement members extending in a longitudinal direction of the body on each side thereof in front of the passenger compartment. The cowl top has end portions secured to the front pillars at substantially a central part thereof in such a manner that the box sections of the cowl top and the front pillar are opposed to each other. Each of the reinforcement member has its rearward end portion bent downward below the cowl top. The reinforcement members are secured to the front pillars in such a manner that the box sections of the reinforcement members and the front pillar are opposed to each other.

4 Claims, 6 Drawing Figures

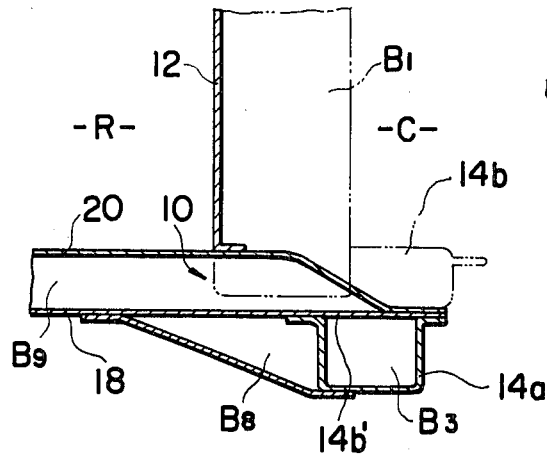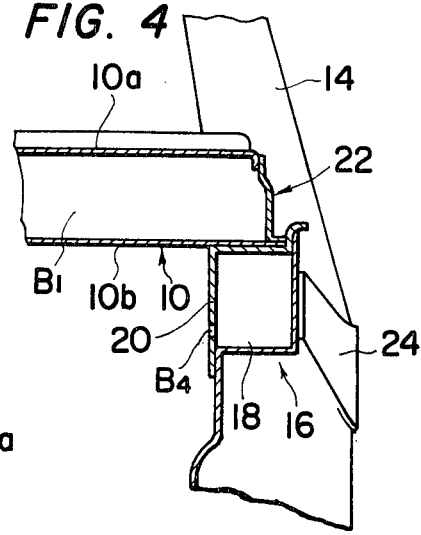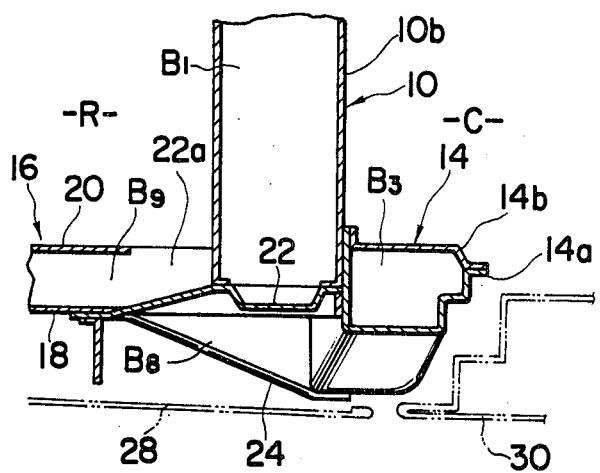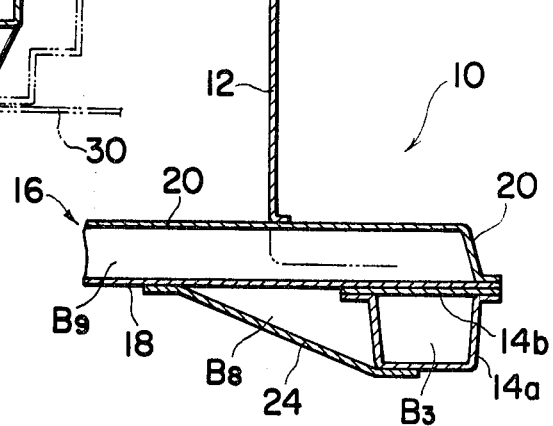

VEHICLE BODY CONSTRUCTION

The present invention relates to a vehicle body construction and, more particularly, to a combined structure which has reinforcement members extending in the longitudinal direction of the vehicle body, each reinforcement member comprising a closed box section formed by a suspension member supporting the strut type suspension unit and a hoodridge panel constituting an engine room side wall, and which comprises the reinforcement members, a closed box section cowl top mounted in front of a passenger compartment extending in a lateral direction of the body, and front pillars of the compartment.

In a conventional combined structure of the above type, the end portion of a cowl top is secured to a front pillar in such a manner that their box sections are opposed to each other and the end portion of a reinforcement member composed of a hoodridge panel and a suspension member is attached to the cowl top is such a manner that their box sections intersect each other at right angles. Alternately, the end portion of the reinforcement member is attached to the front pillar is such a manner that their box sections are opposed to each other and flange portion of the upper and lower panels of the cowl top is attached to the reinforcement members. However, in the case of the former case, while a sufficient rigidity is ensured for the connection between the cowl top and the front pillars, the structure is not preferable from a rigidity point of view since the reinforcement members are not direct by connected to the front pillars. In the latter case, although the connection between the reinforcement members and the front pillars has a sufficient rigidity, the cowl top is simply placed on the reinforcement members and, moreover, the cowl top is connected to the reinforcement members by its flanged end, thus considerably deteriorating its coupling rigidity.

In view of the above, the present invention contemplates the provision of an improved combined structure wherein the cowl top and the reinforcement member are respectively secured to each front pillar in such a manner that their box sections are respectively opposed to that of the front pillar.

These and other objects, features and advantages of the present invention will become more apparent from the following description when take in conjunction with the accompanying drawings, in which:

FIG. 3 is a cross section taken on line III—III of FIG. 1;

FIG. 4 is a cross section taken on line IV—IV of FIG. 1;

FIG. 5 is a cross section taken on line V—V of FIG. 2; and

FIG. 6 is a fragmental view similar to FIG. 3 but shows a modified form of the vehicle construction.

Figure 1:
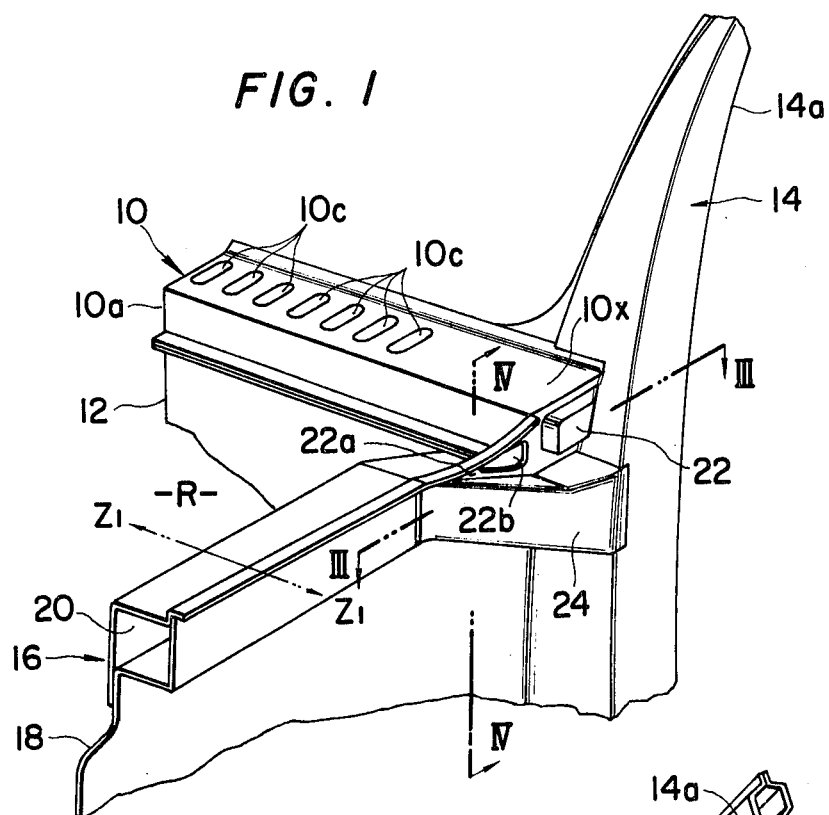
FIG. 1 is a fragmental perspective view of a portion of a vehicle construction according to the present invention.

Referring now to FIGS. 1 to 5, there is schematically shown a preferred embodiment of a vehicle body construction of the present invention. The body construction comprises a cowl top 10 mounted in front of a passenger compartment C and extending in a lateral direction of the body. The cowl top 10 is comprised of an upper panel 10a and a lower panel 10b, forming a closed box in cross section. As best shown in FIG. 1, the cowl top 10 is provided with a plurality of air intake ports 10c to introduce atmospheric air into the passenger compartment C. Numeral 12 designates a dash panel having its one end attached to a flange portion of the cowl top 10, serving as a front compartment wall separating the passenger compartment C and an engine room R from each other. Numeral 14 designates front pillars each of which includes an inner panel 14b and an outer panel 14a to form a closed box structure in cross section and which extend upwardly at each side of the passenger compartment C to form compartment pillars. Numeral 16 designates a reinforcement member having a box-shaped construction which is comprised by a hoodridge panel 18 constituting a side wall of the engine room R and a suspension member 20 supporting a strut type suspension unit (not shown) and which is mounted in front of the compartment C to extend in the longitudinal direction of the body.

As shown in FIGS. 1 and 5, the cowl top 10 is attached to the front pillars 14 in such a manner that an end portion 10x of the cowl top 10 is placed on the front pillar 14 at a substantially central portion thereof, namely, at a position where the upper surface of the cowl upper panel 10a is substantially aligned with a waist line W of the vehicle body, in such a manner that a box section $B_1$ of the cowl top 10 and a box section $B_3$ of the front pillar 14 are opposed to each other. (Here, the term "attached in such a manner that . . . opposed to each other" means that the box sections $B_1$ and $B_3$ are adjoined each other in a horizontal section and at the same time the cowl top 10 is mounted on the front pillar 14.)

Figure 2:
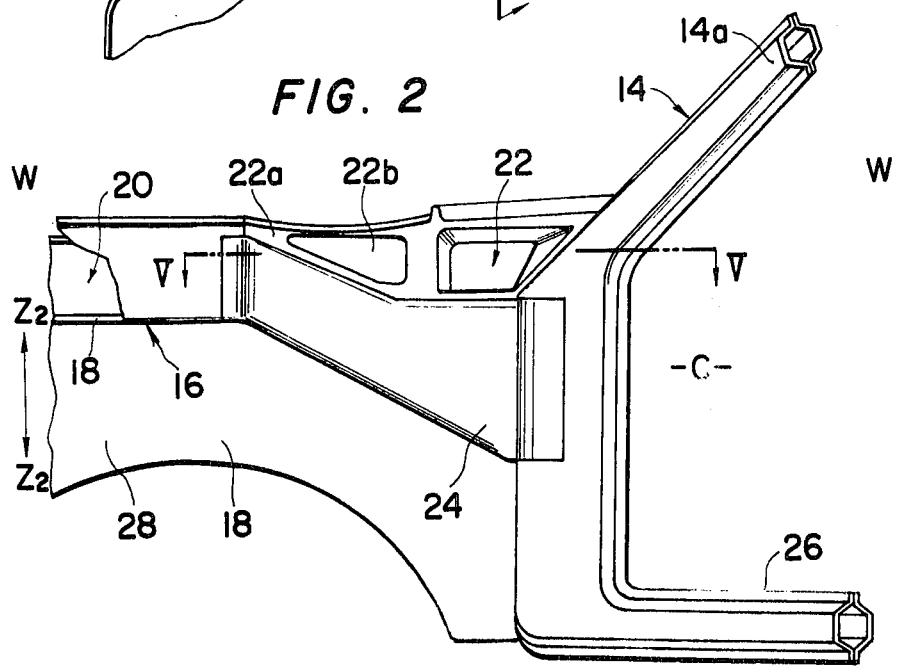
FIG. 2 is a fragmental side view of the vehicle construction shown in FIG. 1.

As shown in FIGS. 1, 2 and 3, a rearward portion of the reinforcement member 20 is slanted downward and secured to the front pillar 14 at a position below the box-shaped structure of the cowl top end portion 10x such that a box section $B_4$ of the reinforcement member 16 and the box section $B_3$ of the front pillar 14 are opposed to each other. In other words, the reinforcement member 16 is bent downward in a stepped shape and extends through the dash panel 12 toward the compartment C. Thus, the rearward end of the reinforcement member 20 is secured to the front pillar 14 so as to permit the mounting of the end portion 10X of the cowl top 10 on the reinforcement member 20. Particularly, in accordance with the present embodiment, a rearward end portion of the hoodridge panel 18 constitutes an inner panel 14b' of the front pillar 14 and this inner panel 14b' forms a part of box-shaped section, saving material. Consequently, the component part of the front pillar 14 to which the cowl top 10 is connected and the component part of the front pillar 14 to which the suspension member 20 of the reinforcement member 16 is secured are separately formed and secured to each other by welding. However, in a case where the hoodridge panel 18 and the front pillar 14 are separately formed as shown in FIG. 6, a closed box-section of the front pillar 14 is comprised of an inner panel 14b and an outer panel 14a, and the hoodridge panel 18 and the suspension member 20 are superposed on and connected to the front pillar inner panel.

As shown in FIG. 4, the cowl top 10 and the reinforcement member 16 are connected to each other in such a manner that the end portion 10x of the cowl top 10 is mounted on the reinforcement member 16 at the rearward end thereof such that the box sections $B_1$ and $B_4$ are opposed to each other.

On the other hand, a cowl side panel 22 for closing the box section $B_1$ is attached to each end of the cowl top 10, and the cowl side panel 22 extends forward and is connected at its forward end 22a to the hoodridge panel 18, with the peripheral portions of the cowl side panel 22 connected to the front pillar 14 and the reinforcement member 16, respectively. The forward extension 22a of the cowl side panel 22 is formed with an opening 22b for communicating the engine room R with the atmosphere of the vehicle to discharge the hot air in the engine room R to the atmosphere. Of cource, the cowl side panel 22 constitutes a patch member (a reinforcing patch plate) connected the reinforcement member 16 and the cowl top 10.

Further, the outer panel 14a of the front pillar is also connected to a portion of the reinforcement member 16 by a stay member 24 and, as shown in FIG. 3, the front pillar 14 is held between the stay member 24 and the rear end of the suspension member 20 of the reinforcement member 16. In this case, the hoodridge panel 18 and the stay member 24 define a spacing $B_8$ which is positioned, along with the space portion $B_4$, adjacent the box section $B_3$ of the front pillar 14. In the Figures, numeral 26 designates a side sill, 28 a front fender, and 30 a door. With the construction described so far, the cowl top 10 and the front pillar 14 are firmly connected to each other in such a manner that the box sections $B_1$ and $B_3$ are opposed to each other, and the reinforcement member 16 and the front pillar 14 are firmly connected to each other in such a manner that the box sections $B_4$ and $B_3$ are opposed to each other. In addition, the reinforcement member 16 and the front pillar 14 are more firmly connected to each other by the stay member 24, and the cowl top 10 and the reinforcement member 16 are firmly connected to each other in such a manner that the box sections $B_1$ and $B_4$ are opposed to each other. In this manner, the three box-shaped members of the cowl top 10, the front pillar 14 and the reinforcement member 16 are connected to one another, thereby remarkably increasing the overall rigidity of the vehicle body. Particularly, by virtue of the construction in which the front pillar 14 is held by the stay member 24 and the reinforcement member 16, the bearing rigidity against the lateral and vertical bending loads which act on the supporting structure of the suspension unit such as shown by arrows $Z_1$ in FIG. 1 and arrows $Z_2$ in FIG. 2 is improved.

In addition, with the bent portion of the reinforcement member 16, in case of a front collision of the vehicle, the energy of the collision can be satisfactorily absorbed by the deformation of the reinforcement member 16, thereby remarkably reducing shocks enconnected by the vehicle's collision. Since the cowl top 10 is connected to the reinforcement member 16 by the cowl side panel 22 and the reinforcement member 16 cannot be bent easily during vehicle's collision, the plate thickness of the cowl side panel 22 may be varied so as to properly control the collision energy absorbing characteristic during front collision of the vehicle. Moreover, by virtue of the fact that the hot air in the engine room R can be discharged to the outside of the vehicle through the opening 22b in the cowl side panel 22, it is possible to considerably reduce the occurrence of irregularities in operations of the engine and engine auxiliaries caused by the heat generated from exhaust emission control systems such as a reactor, catalyst, etc., which are installed for purifying engine exhaust gases.

What is claimed is:

1. A vehicle body construction having a passenger compartment, comprising a substantially closed box section cowl top mounted in front of the passenger compartment and extending in a lateral direction of said body, said cowl top having an upper panel and a lower panel having a vertical wall, closed box section front pillars extending upwardly at each side of said passenger compartment, said front pillars having an inner and outer panel, and closed box section reinforcement members each formed by a hoodridge panel and a suspension member having a horizontal wall, said reinforcement members extending in a longitudinal direction of said body on each side thereof in front of said passenger compartment, said cowl top having end portions secured to said front pillars at substantially a central part thereof in such a manner that the vertical wall of the lower panel of the closed box section of said cowl top is secured to the outer panel of said front pillar, each of said reinforcement members having its rearward end portion bent downward below said cowl top and secured thereto such that the horizontal wall of the suspension member of said reinforcement member is connected to the lower panel of said cowl top, and said each of said reinforcement members having its hoodridge panel secured to the outer panel of said front pillar and serving as the inner panel of said front pillar, whereby ends of said cowl top, reinforcement members and front pillars are connected to each other.

2. A vehicle body construction as claimed in claim 1, wherein said cowl top has a cowl side panel which is connected to each terminal end of said cowl top to close the closed box section of said cowl top, and said cowl side panel extends forwardly and is connected to each of said reinforcement members.

3. A vehicle body construction as claimed in claim 1, wherein said each reinforcement member is provided with a stay member through which an outer panel of said front pillar is connected to said each reinforcement member at a point forward of said bent portion, and said front pillar is held between said stay member and a rear end portion of said each reinforcement member.

4. A vehicle body construction as claimed in claim 2, wherein said cowl side panel has an opening to provide communication between an engine room of said vehicle body and the atmosphere.

* * * * *